(12) United States Patent  
Iwane (10) Patent No.: US 8,040,316 B2  
(45) Date of Patent: Oct. 18, 2011

(54) DISPLAY ELEMENT, DISPLAY DEVICE, AND CAMERA

(75) Inventor: Toru Iwane, Yokohama (JP)

(73) Assignee: Nikon Corporation, Tokyo (JP)

( * ) Notice: Subject to any disclaimer, the term of this patent is extended or adjusted under 35 U.S.C. 154(b) by 1027 days.

(21) Appl. No.: 11/819,688

(22) Filed: Jun. 28, 2007

(65) Prior Publication Data

US 2008/0007952 A1    Jan. 10, 2008

(30) Foreign Application Priority Data

Jul. 5, 2006    (JP) ................................. 2006-185154

(51) Int. Cl.
*G09G 3/36* (2006.01)
(52) U.S. Cl. .......................................... 345/102; 345/87
(58) Field of Classification Search ............ 345/87–103, 345/204; 359/3, 15, 22; 349/106, 201, 202; 396/296, 288
See application file for complete search history.

(56) References Cited

U.S. PATENT DOCUMENTS

| 5,570,210 | A  | * | 10/1996 | Yoshida et al. .................. 349/86 |
| 5,669,022 | A  |   | 9/1997  | Kadohara et al. |
| 5,748,272 | A  | * | 5/1998  | Tanaka et al. ................... 349/86 |
| 5,825,448 | A  | * | 10/1998 | Bos et al. ....................... 349/128 |
| 6,955,839 | B2 | * | 10/2005 | Gocho et al. .................... 428/1.2 |
| 7,312,906 | B2 | * | 12/2007 | Sutherland et al. .............. 359/15 |
| 7,511,784 | B2 | * | 3/2009  | Ushiro et al. .................. 349/106 |
| 7,542,669 | B2 | * | 6/2009  | Koishi .......................... 396/296 |
| 2004/0008391 | A1 | * | 1/2004 | Bowley et al. ..................... 359/3 |
| 2005/0036780 | A1 | * | 2/2005 | Iwane ........................... 396/111 |
| 2006/0034603 | A1 | * | 2/2006 | Homma ......................... 396/296 |

FOREIGN PATENT DOCUMENTS

| JP | A-2002-0072333 | 3/2002 |
| JP | A-2002-0122906 | 4/2002 |
| JP | A 2004-191415  | 7/2004 |
| WO | WO 00/16135 A1 | 3/2000 |

* cited by examiner

*Primary Examiner* — Ricardo L Osorio
(74) *Attorney, Agent, or Firm* — Oliff & Berridge, PLC (57) ABSTRACT

A display element includes a display substrate that comprises a liquid crystal; and a plurality of diffraction gratings having different diffraction modes, arranged in regions of the single display substrate that are different from one another.

8 Claims, 7 Drawing Sheets

DISPLAY ELEMENT, DISPLAY DEVICE, AND CAMERA

INCORPORATION BY REFERENCE

The disclosure of the following priority application is herein incorporated by reference:

Japanese Patent Application No. 2006-185154, filed Jul. 5, 2007

BACKGROUND OF THE INVENTION

1. Field of the Invention

The present invention relates to a display element that utilizes a liquid crystal, to a display device that is equipped with such a display element, and to a camera.

2. Description of Related Art

From the prior art, there is known an in-viewfinder display device that utilizes a liquid crystal panel such as the one described in Japanese Laid-Open Patent Publication 2004-191415.

However in order to use a combination of different diffraction modes in this display device such as a liquid crystal diffraction grating panel and a liquid crystal hologram, the size of the display device comes to be undesirably increased.

SUMMARY OF THE INVENTION

A display element according to a 1st aspect of the present invention includes: a display substrate that comprises a liquid crystal; and a plurality of diffraction gratings having different diffraction modes, arranged in regions of the single display substrate that are different from one another.

According to a 2nd aspect of the present invention, in the display element according to the 1st aspect, it is preferable that each of the plurality of diffraction gratings creates a different diffraction state with respect to the liquid crystal.

According to a 3rd aspect of the present invention, in the display element according to the 1st aspect, the plurality of diffraction gratings may include a Bragg diffraction grating that diffracts an illumination light beam in a predetermined direction, and a hologram that creates scattered light.

A display element according to a 4th aspect of the present invention includes a display substrate that comprises a plurality of diffraction gratings having different diffraction modes, integrally formed in different regions of the display substrate.

A display element according to a 5th aspect of the present invention includes: a display substrate that comprises a liquid crystal: a first diffraction grating disposed in a first region of the display substrate; and a second diffraction grating that is disposed in a second region peripheral to the first region, and has a diffraction mode that is different from a diffraction mode of the first diffraction grating.

A display device according to a 6th aspect of the present invention includes: a display substrate that comprises a liquid crystal; a plurality of diffraction gratings having different diffraction modes, arranged in regions of the single display substrate that are different from one another; and a controller that controls the plurality of diffraction gratings alternatingly to their diffraction states.

According to a 7th aspect of the present invention, the display device according to the 6th aspect may further includes a light source that irradiates an illumination light beam upon the display substrate, and it is preferable that the plurality of diffraction gratings comprise a Bragg diffraction grating that diffracts an incident light beam in a predetermined direction, and a hologram that creates scattered light; and the controller performs control so as to alternatingly repeat a first display state in which the illumination light beam is irradiated, the diffraction state of the Bragg diffraction grating is implemented, and moreover the diffraction state of the hologram is canceled, and a second display state in which the illumination light beam is not irradiated, the diffraction state of the Bragg diffraction grating is eliminated, and moreover the diffraction state of the hologram is implemented.

According to a 8th aspect of the present invention, in the display device according to the 7th aspect, the light source may be a light emitting diode; and it is preferable that the controller determines an effective amount of light generated by the light emitting diode, based upon a ratio between a continuous time period of the first display state, and a continuous time period of the second display state.

According to a 9th aspect of the present invention, in the display device according to the 8th aspect, the controller may control an amount of light generated by the light emitting diode to the effective amount of light generated, by alternatingly repeating, within the continuous time period of the first display state, lighting up the light emitting diode with an electrical current that is greater than its static rated electrical current, and turning off the light emitting diode.

A camera according to a 10th aspect of the present invention includes a display device according to the 7th aspect.

According to a 11th aspect of the present invention, in the camera according to the 10th aspect, the controller may perform display of photographic information by putting the Bragg diffraction grating into its diffraction state, and may change a region of the display substrate through which light passes by putting the hologram into its diffraction state.

A method for manufacturing a display element according to a 12th aspect of the present invention: forms a first diffraction grating in a first region in a display substrate; and forms a second diffraction grating whose diffraction mode differs from a diffraction mode of the first diffraction grating, in a second region in the display substrate that is different from the first region.

According to a 13th aspect of the present invention, in the method for manufacturing a display element according to the 12th aspect, it is preferable that a Bragg diffraction grating that diffracts an illumination light beam in a predetermined direction is used as the first diffraction grating, and a hologram that creates scattered light is used as the second diffraction grating.

A method for manufacturing a display device according to a 14th aspect: provides a display substrate that comprises a liquid crystal; provides, in mutually different regions of the display substrate, a plurality of diffraction gratings each of which has a different diffraction mode; and provides a controller that controls the diffraction states of the plurality of diffraction gratings alternatingly.

According to a 15th aspect of the present invention, in the method for manufacturing a display device according to the 14th aspect, it is preferable that the plurality of diffraction gratings includes a Bragg diffraction grating that diffracts an illumination light beam in a predetermined direction, and a hologram that creates scattered light.

A display method according to a 16th aspect of the present invention: establishes a first display state in which, along with putting a Bragg diffraction grating that is provided in a first region of a display substrate that comprises a liquid crystal into its diffraction state, a hologram that is provided in a second region of the display substrate that is different from the first region is put into its non-diffraction state, and a light beam is irradiated from a light source upon the display substrate; establishes a second display state in which, along with not irradiating the light beam upon the display substrate and putting the hologram into its diffraction state, the Bragg diffraction grating is put into its non-diffraction state; and alternatingly repeats the first display state and the second display state.

According to a 17th aspect of the present invention, in the display method according to the 16th aspect, the irradiation of the light beam may be performed with an amount of generated light that is determined based upon a ratio between a continuous time period of the first display state and a continuous time period of the second display state.

According to 18th aspect of the present invention, in the display method according to the 17th aspect, it is preferable that the amount of generated light is controlled, within the continuous time period of the first display state, by repeating lighting up the light source with an electrical current that is greater than its static rated electrical current, and turning off the light source.

According to a 19th aspect of the present invention, in the display method according to the 16th aspect, along with performing display of information in the first display state, a region of the display substrate through which light passes may be changed in the second display state.

BRIEF DESCRIPTION OF THE DRAWINGS

FIGS. 3A and 3B are schematic figures for explanation of the functioning of this liquid crystal display panel: FIG. 3A shows a first display state thereof, while FIG. 3B shows a second display state thereof;

FIGS. 4A through 4D are figures showing an example of time division display control: FIG. 4A shows a signal that commands the timing for illuminating a light source, FIG. 4B shows a common signal, FIG. 4C shows a segment signal, and FIG. 4D shows a crop signal:

FIGS. 5A and 5B are figures for explanation of this time division control for illumination: FIG. 5A shows a case in which the duty ratio of the illuminated time period is 1/8, while FIG. 5B shows a case in which the duty ratio of the illuminated time period is 1/5;

DESCRIPTION OF THE PREFERRED EMBODIMENTS

Figure 1:
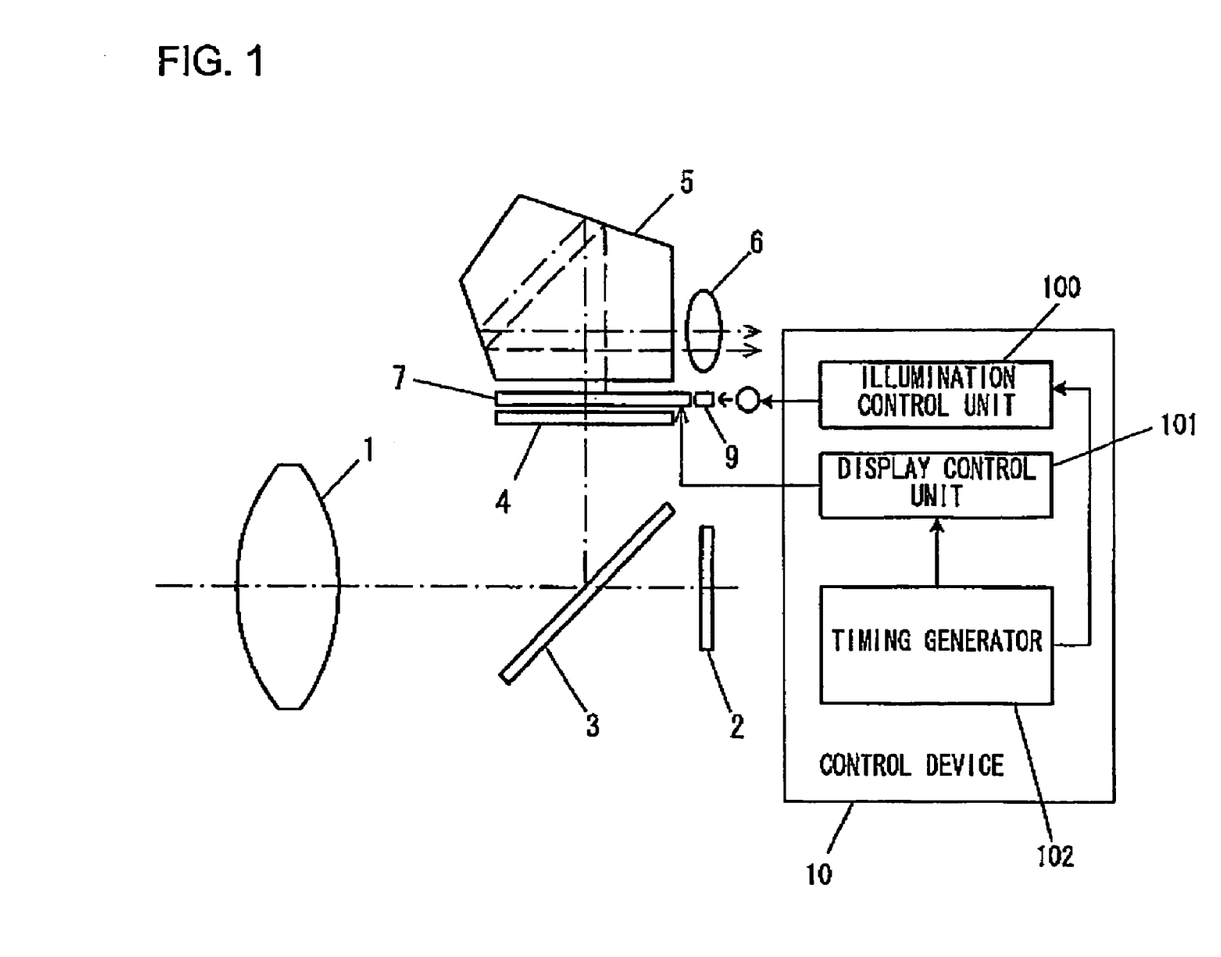
FIG. 1 is a figure showing an embodiment of a display device according to the present invention.

In the following, preferred embodiments for implementation of the present invention will be explained with reference to the figures. FIG. 1 is a figure showing an embodiment of a display device according to the present invention, and is a general structural figure for a case in which this display device is applied as a viewfinder display device of a camera. The reference symbol 1 denotes a photographic lens. An image of a light flux from a photographic subject is formed upon an image sensor 2 by this photographic lens 1, and an image of the photographic subject having been formed is captured by the image sensor 2. A solid-state image capture element such as a CCD or a CMOS or the like may be employed as this image sensor 2.

Between the photographic lens 1 and the image sensor 2, there is provided a mirror 3 that reflects the light flux from the photographic subject towards a viewfinder optical system. During exposure, this mirror 3 is driven so as to be shunted away from the optical path, so that the image of the photographic subject is projected upon the image sensor 2. On the other hand, when exposure is not being performed, the light flux from the photographic subject having passed through the photographic lens 1 is reflected by the mirror 3, and is imaged upon a viewfinder screen 4 that is disposed in a position that is optically equivalent to the image capturing surface of the image sensor 2. This image of the photographic subject that has been formed upon the view finder screen 4 may be observed via a penta-prism 5 and an eyepiece lens 6.

A liquid crystal display panel 7 for performing in-viewfinder display is provided above and in the neighborhood of the viewfinder screen 4. And, at the side of this liquid crystal display panel 7, there is disposed a light source 8 that illuminates the liquid crystal display panel 7. In this embodiment, a light emitting diode (LED) is used as the light source 8. The illumination light that has been emitted from this light source 8 is incident upon the liquid crystal display panel 7 via a light guiding element 9. This light guiding element 9 is an optical element for conducting the illumination light into the liquid crystal display panel 7 with good efficiency. The display light from the liquid crystal display panel 7 arrives at the eyepiece lens 6 via the penta-prism 5. As a result, a display is superimposed upon the image of the photographic subject, and the image of the photographic subject with the display superimposed may be observed.

The reference symbol 10 denotes a control device for controlling a display to be superimposed upon the image of the photographic subject. This control device 10 includes an illumination control unit 100 that controls the drive of the light source 8, a display control unit 101 that controls the drive of the liquid crystal display panel 7, and a timing generator 102 that outputs a signal for the ON/OFF timing of this illumination and display. The illumination control unit 100 and the display control unit 101 perform their respective control actions, based upon the timing signals that are inputted from the timing generator 102.

Figure 2:
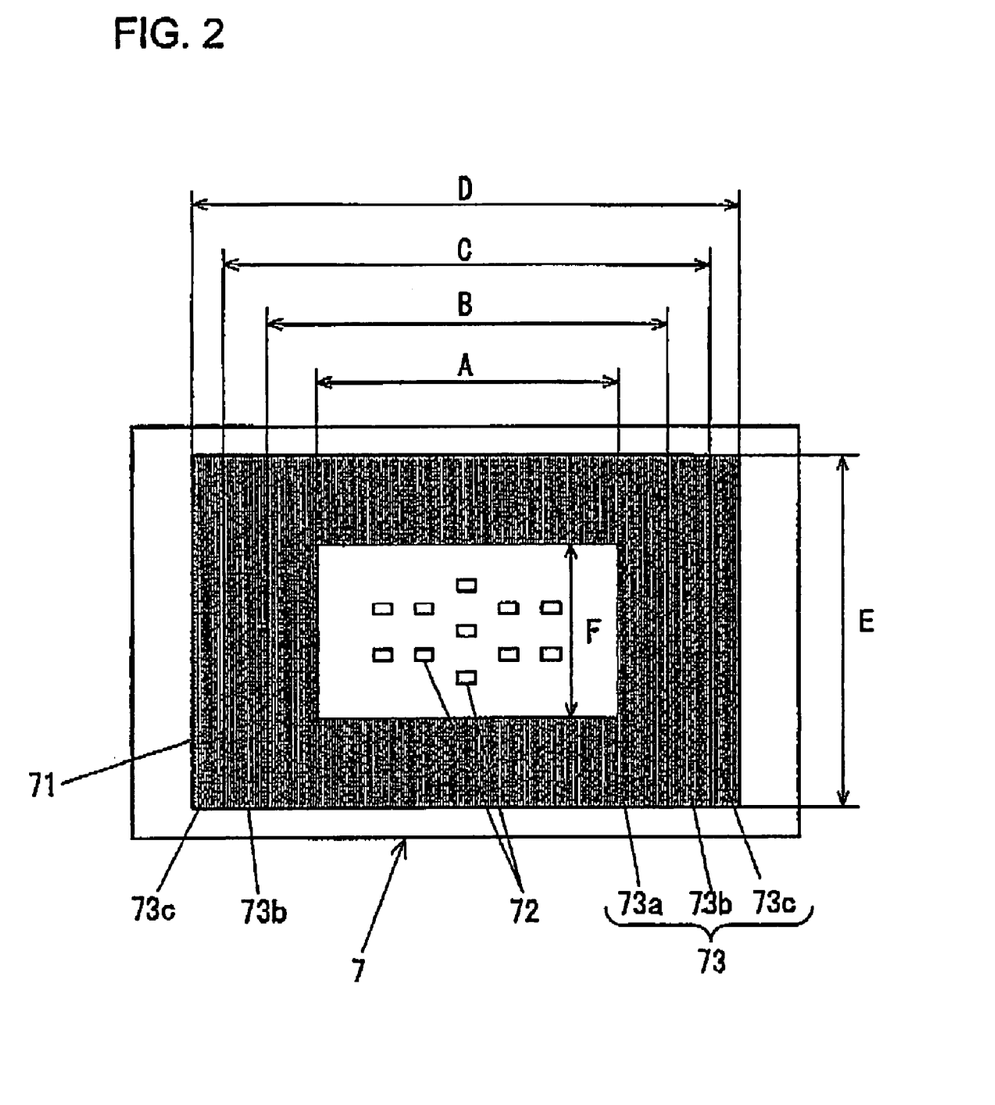
FIG. 2 is a plan view of a liquid crystal display panel.

FIG. 2 is a plan view of the liquid crystal display panel 7. A plurality of AF are a marks 72 are arranged in the center of the screen, and it is possible to display any one of these selectively, so as to show the position of a subject upon which focal point adjustment is to be performed. Furthermore, this camera is provided with a function of selecting an image capture region from a plurality of image capture regions, and it is arranged that the selected image capture regions can be recognized in a simple manner, by displaying a field of view frame for the photographic subject with crop regions 73 (73a, 73b, and 73c) upon which hatching is provided. When none of these crop regions 73a through 73c is displayed, then the rectangular region 71 that has dimensions E vertically by D horizontally shows the normal (maximum) image capture are a, while it is arranged for it to be possible to display smaller image capture regions by displaying the crop regions 73a through 73c.

When the left and right pair of crop regions 73c are displayed, the image capture region becomes E vertically by C horizontally. When the left and right pairs of crop regions 73b and 73c are displayed, the image capture region becomes E vertically by B horizontally. And, when all of the crop regions 73a through 73c are displayed, the image capture region becomes F vertically by A horizontally. Since image processing and so on are performed based upon image capture signals, in the image capture signal outputted from the image sensor 2, from image capture regions that correspond to these image capture regions, accordingly, the smaller the image capture region becomes, the smaller does the image size become, as is appropriate for high speed photography.

Figure 3A:
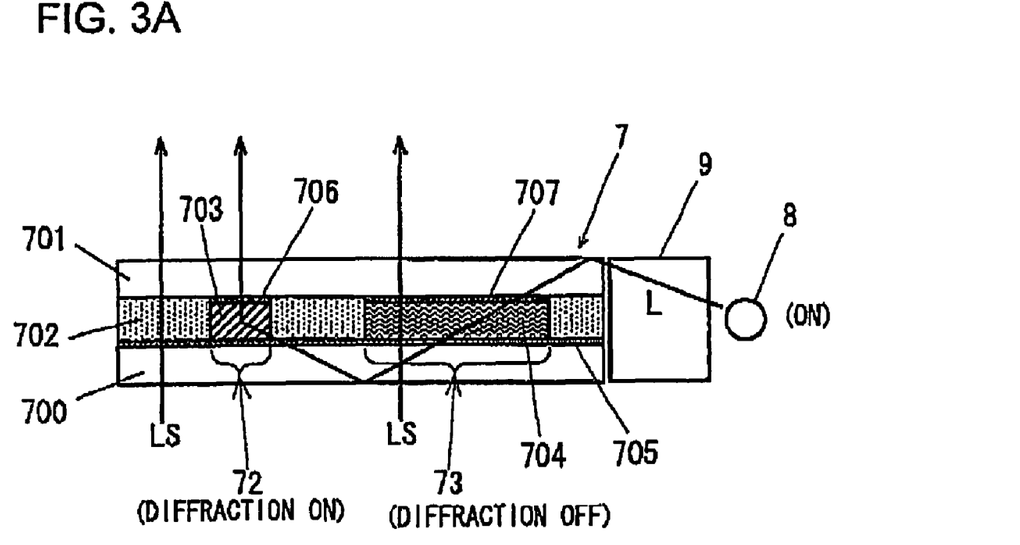
Figure 3B:
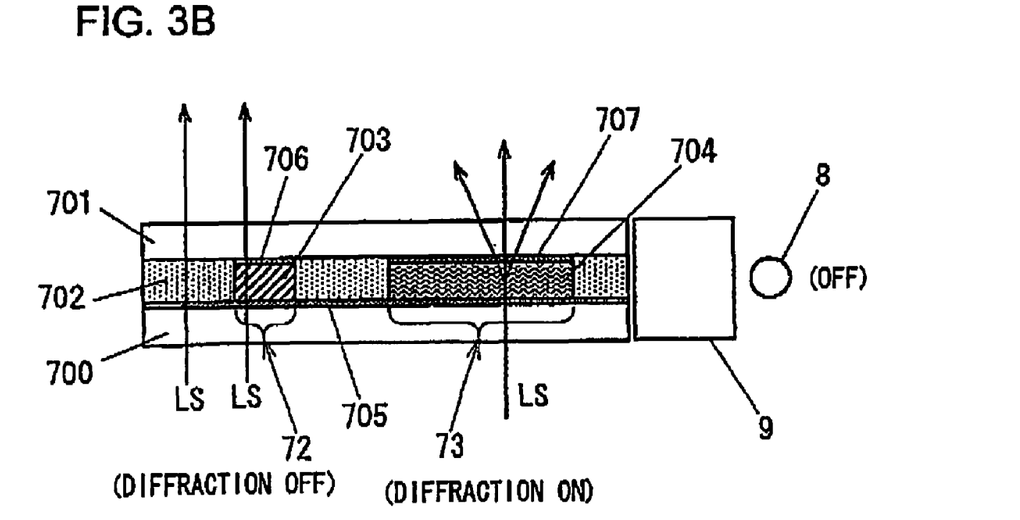

FIGS. 3A and 3B are figures for explanation of the functioning of the liquid crystal display panel 7, and they show schematic cross sections of the liquid crystal panel 7. FIG. 3A shows a first display state in which only the AF area marks 72 are being displayed, while FIG. 3B shows a second display state in which only the crop region 73 is being displayed. This liquid crystal display panel 7 is a diffraction optical element that utilizes a polymer-dispersed liquid crystal. In a liquid crystal layer 702 that is sandwiched between transparent substrates 700 and 701, there are formed a Bragg diffraction grating 703 that corresponds to the AF area marks 72, and an object hologram 704 that corresponds to the crop region 73.

Upon the surfaces of the transparent substrates 700 and 701 on the side of the liquid crystal layer 702, electrodes 705, 706, and 707 are formed from transparent electrically conductive layers made from ITO (tin doped indium oxide) or the like. The electrodes 706 and 707 are formed in the same shapes as the AF area marks 72 and the crop region 73 respectively, while the electrode 705 is formed as a background pattern over the entire substrate surface. It should be understood that, although peripheral electrodes other than the electrodes 706 and 707 are formed upon the side of the transparent substrate 701, these are not shown in the drawings.

The polymer-dispersed liquid crystal is a substance in which a liquid crystal is dispersed within a polymer as liquid crystal droplets. In the Bragg diffraction grating 703, a diffraction grating is formed by interference pattern in which polymer layers and layers in which these liquid crystal droplets are distributed in large numbers are alternatingly repeated. In the state in which the applied voltage to the electrode 706 is turned OFF so that no electrical potential difference is present between the electrodes 705 and 706, the liquid crystal molecules are oriented randomly, so that the diffraction function of the Bragg diffraction grating 703 is manifested due to the refractive index difference between the polymer layers and the liquid crystal droplet layers.

As shown in FIG. 3A, when the light source 8 is turned ON and the applied voltage to the electrode 706 is turned OFF, then the illumination light L that is incident into the liquid crystal panel 7 via the light guiding element 9 is diffracted by the Bragg diffraction grating 703 in the direction of the eyepiece lens 6 (refer to FIG. 1). The Bragg diffraction grating 703 is patterned in the shape of the AF area mark, and the observer is able to see that the portion of the AF area mark 72 is emitting light, since only this portion emits the illumination light in the direction of his line of sight. It should be understood that, since a voltage is always applied to a peripheral electrode not shown in the figure, accordingly the liquid crystal molecules are oriented in the direction perpendicular to the substrate, and the liquid crystal layer 702 is put into a transparent state, so that the light LS from the photographic subject passes through this liquid crystal layer 702. Due to this, the observer is able to observe an image of the photographic subject upon the viewfinder screen 4.

On the other hand, when the applied voltage to the electrode 706 is turned ON, then the liquid crystal molecules of the liquid crystal droplet layer are oriented in the direction perpendicular to the substrate, so that the liquid crystal droplet layer comes to have almost the same refractive index as the polymer layer. As a result, the diffraction function of the Bragg diffraction grating 703 is eliminated, and the AF area mark 72 is not observed, since the illumination light L is not diffracted (refer to FIG. 3B). Furthermore, the Bragg diffraction grating 703 also becomes a transparent state with respect to the light LS from the photographic subject as well, so that the observer is still able to observe the image of the photographic subject formed on the viewfinder screen 4.

In the object hologram 704 that is formed in the crop region 73, a hologram of a scattering plate is formed by the liquid crystal droplets that are dispersed within a polymer. In the state in which no voltage is applied to the electrode 707, the diffraction function of this object hologram 704 is manifested, and the same wave front is generated for the light that is incident from underneath (i.e. the light LS from the photographic subject), as that of the scattering plate that was the model for this hologram (refer to FIG. 3B). In other words, the object hologram 704 operates as a scattering plate for the incident light. The scattered light that is emitted from this object hologram 704 is, ideally, spread out over a solid angle in all directions, so that a portion thereof comes to be observed via the penta-prism 5 and the eyepiece lens 6. As a result, the image of the photographic subject in the crop region 73 comes to be observed more darkly, as compared to the other regions.

On the other hand, when the voltage applied to the electrode 707 is turned ON, then the diffraction function of the object hologram 704 is eliminated, since the liquid crystal molecules in the liquid crystal droplet layer are oriented in the direction perpendicular to the substrate. As a result, the light LS from the photographic subject is not scattered by the crop region 73, and passes through the liquid crystal panel 7 (refer to FIG. 3A).

Now, when the diffraction function of the object hologram 704 is in the ON state (i.e., the applied voltage is OFF), since the illumination light L from the light source 8 is also scattered, accordingly the crop region 73 is undesirably observed as being luminous, so that the primary function of the crop region 73 comes to be lost. Due to this, in the second display state shown in FIG. 3B in which only the crop region 73 is displayed, the light source 8 is turned OFF in order to eliminate scattering of the illumination light in the crop region 73.

In other words, if the two types of diffraction grating 703 and 704 are disposed upon in a single liquid crystal panel 7, when the AF area a mark 72 is made to emit light and to be displayed, the illumination light is scattered by the crop region 73, which is undesirable. Due to this, in this embodiment, it is arranged to employ a display method in which the display time period is time divided, and display is performed in the first display state during a portion of the time, while display is performed in the second display state during the remaining time. When this type of time division display control is performed, the AF area mark 72 and the crop region 73 are observed as being displayed simultaneously due to an afterimage effect, since the display state of FIG. 3A and the display state of FIG. 3B are repeated alternatingly at extremely short time intervals.

Figure 4A:
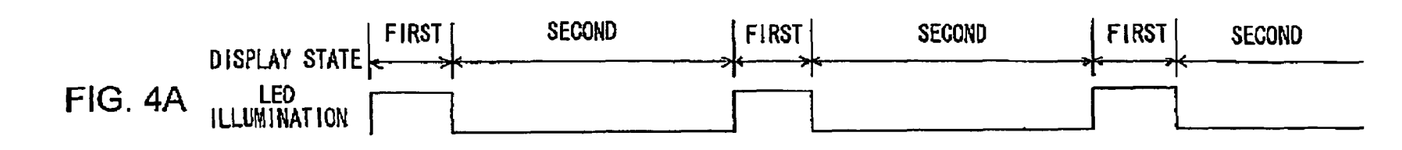
Figure 4B:
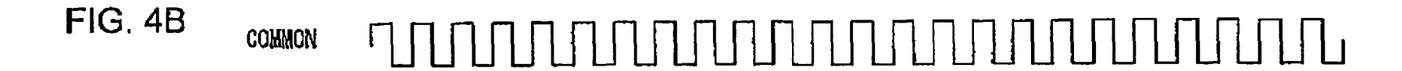
Figures 4C, 4D:
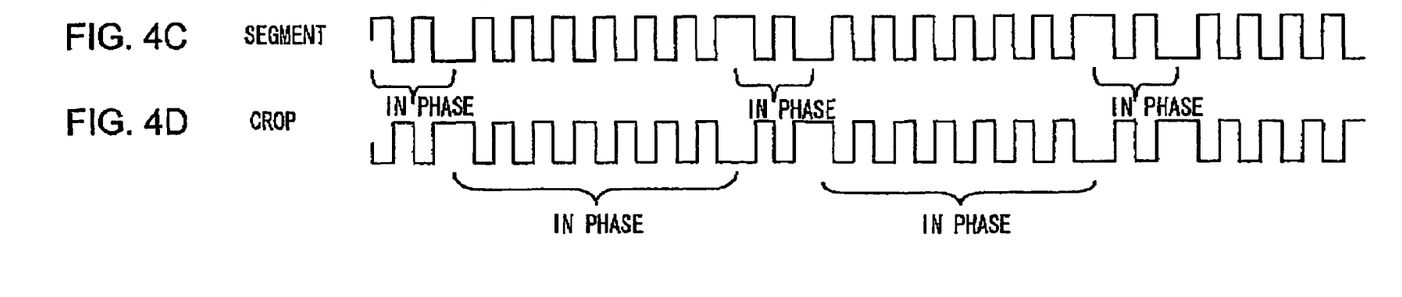

FIGS. 4A through 4D are figures showing an example of this time division display control, and show the timing signals that are outputted from the timing generator 102 of FIG. 1. FIG. 4A shows the signal that commands the timing for turning on/off the light source 8, and is inputted to the illumination control unit 100. And FIGS. 4B through 4D show the signals to the electrodes 705, 706, and 707, each of which is inputted to the display control unit 101. FIG. 4B shows a common signal related to the voltage that is applied to the common electrode 705 for the diffraction gratings 703 and 704. And FIG. 4C shows a segment signal related to the voltage that is applied to the electrode 706, while FIG. 4D shows a crop signal related to the voltage that is applied to the electrode 707.

Generally, a liquid crystal is driven by the method of applying a rectangular wave voltage to two electrodes on opposite sides thereof. For example, the state in which the voltage applied to the electrode 707 is ON may mean the state in which the phases of the rectangular waves upon the electrode 707 and the electrode 705 differ by n, while the state in which the applied voltage is OFF may mean the state in which the phases of the rectangular waves upon the electrode 707 and the electrode 705 are the same. In other words, the turning ON and OFF of the applied voltage is expressed as a phase shift of the segment signal and the crop signal of FIGS. 4C and 4D with respect to the common signal of FIG. 4B.

A rectangular wave voltage of a fixed frequency is applied to the common electrode 705 by the common signal. And ON/OFF control of the diffraction gratings 72 and 73 is performed by changing the phases of the segment signal and the crop signal. As explained with reference to FIGS. 3A and 3B, lighting up of the light source 8 is synchronized with the ON state of the diffraction grating 703, while turning off of the light source 8 is synchronized with the ON state of the object hologram 704. Due to this, changing over of the lighting up signal of FIG. 4A between the HI state and the LO state is synchronized with the changing over between the first display state in which only the AF are a mark 72 is displayed, and the second display state in which only the crop region 73 is displayed, respectively shown in FIGS. 3A and 3B.

In the first display state in which the lighting up signal for the light source 8 is in the HI state, the segment signal is generated so as to have the same phase as the common signal, while the crop signal is generated so as to be phase shifted by n with respect to the common signal. As a result, along with the diffraction grating 703 being put into the ON state, also the object hologram 704 is put into the OFF state, and in this time period only the AF are a mark 72 comes to bed is played. In this time period, since the object hologram 704 comes to be in the transparent state both with respect to the light from the photographic subject and also with respect to the illumination light, accordingly the crop region 73 is neither brightened nor dimmed.

On the other hand, in the second display state in which the lighting up signal for the light source 8 is in the LO state, the crop signal is generated so as to have the same phase as the common signal, while the segment signal is generated so as to be phase shifted by $\pi$ with respect to the common signal. As a result, along with the object hologram 704 being put into the ON state, also the diffraction grating 703 is put into the OFF state, and in this time period only the crop region 73 is displayed as dimmed. In this time period, since the light source 8 is turned OFF, accordingly the crop region 73 is not caused to shine by the illumination light.

Since the change over between the first and second display states is repeated at a shorter time interval than that at which a human being can discriminate temporal decomposition, accordingly the observer comes to see that the first display state and the second display state are blended together, due to the afterimage effect. Here, if the ratio between the time interval for the first display state and the time interval for the second display state is made to be 1:4, the light emission luminance of the AF are a mark 72 is made to be 10, and the dimming ratio of the crop region 73 (=1−the amount of light shielding) is made to be 0.1, then the light emission intensity when blended display is performed becomes 1/5, while the dimming of the crop region 73 becomes 0.28 (in other words, the light shielding amount becomes 0.72). Due to this, it will be understood that the dimmed display of the crop region 73 and the light emitting display of the AF are a mark 72 are mutually compatible. It should be understood that, by changing the ratio of the time intervals, it is possible to adjust the degree of dimming of the crop region 73 and the light emission intensity of the AF are a mark 72.

In this manner, with the display device of this embodiment, by performing time division display control as described above, it is possible to display simultaneously, with a single liquid crystal display panel, both a frame display in which an image such as that of the crop region 73 is darkened, and also a light emitting display such as that of the AF are a mark 72.

Now, if the AF are a mark 72 is displayed as emitting light, it is desirable from the point of view of performing recognition that, when the background image of the photographic subject is dark, then it should be displayed as emitting light darkly; and, conversely, if the image of the photographic subject is bright, then it is desirable for it to be displayed as emitting light brightly. In this case, since control for changing the electrical current for the LED that is being used as the light source 8 is difficult, in the time interval for the first display state, the light source 8 is not caused to emit light at a fixed intensity, but rather control is performed to time divide the section up more finely so as to turn the light source 8 ON and OFF repeatedly.

Figure 5A:
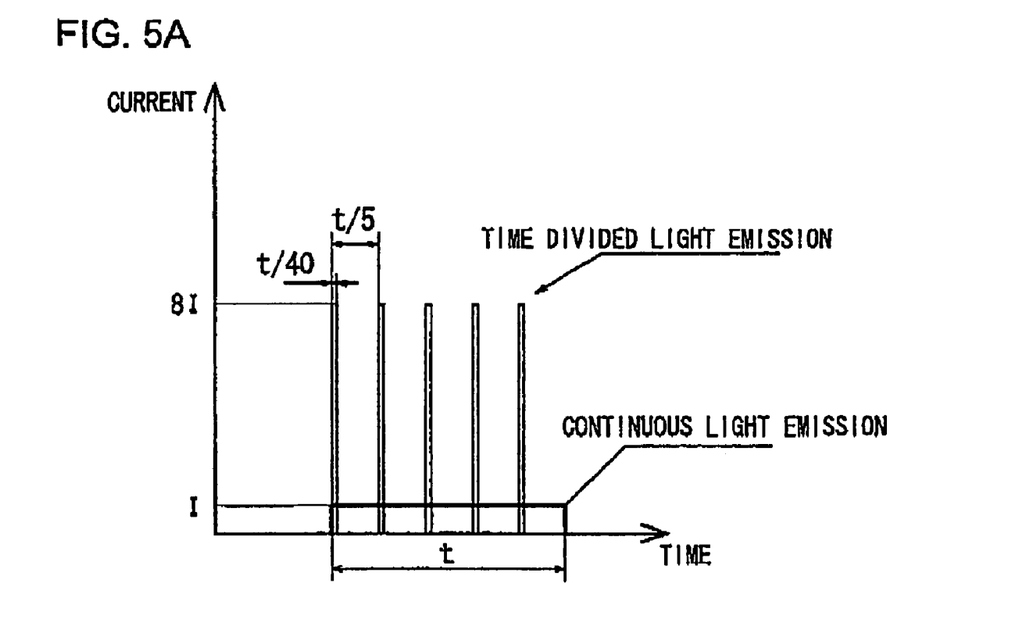
Figure 5B:
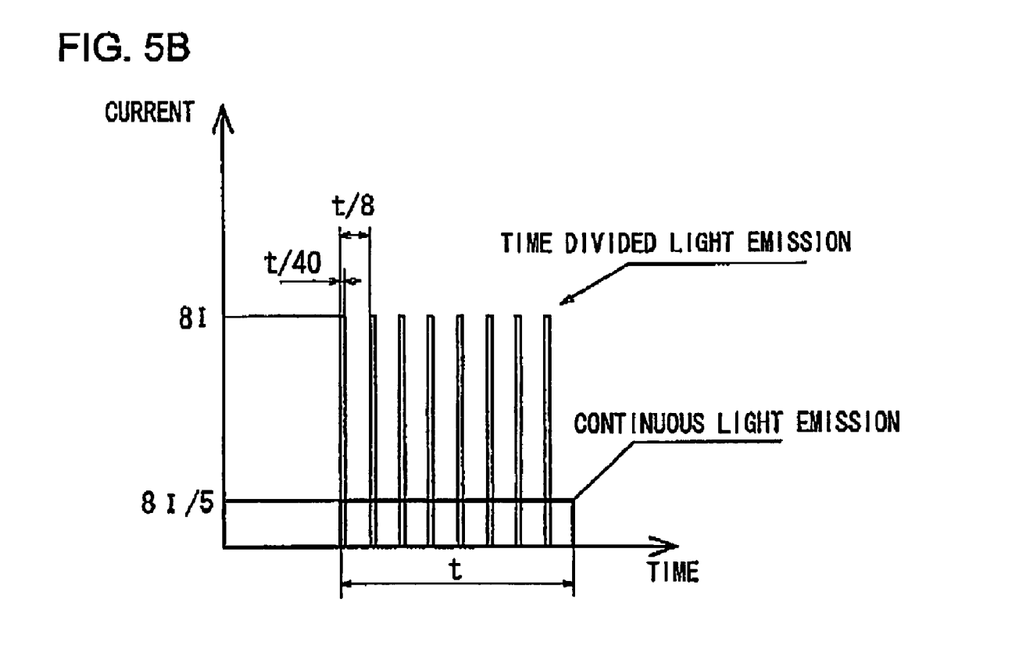

FIGS. 5A and 5B are figures for explanation of this time division control for illumination. In FIG. 5A, the light emission control shown by the thick line shows the case in which light is emitted continuously, while the light emitting control shown by the thin line shows time division control. It should be understood that the horizontal axis is time, while the vertical axis is the electrical current to the light source B. The time period t is the time interval shown in FIGS. 4A through 4D for the first display state, while I is the rated electrical current value for the LED.

In the case of an LED, generation of heat is the reason why a large electrical current is not caused to flow continuously. It is possible to flow a much larger electrical current for a short time period. In the example shown in FIG. 5A, the duty ratio for the illumination time period is 1/8, so that, by causing a current flow of 8I that is eight times the rated current value, it is arranged to obtain a light emission intensity that is equal to the intensity of continuous light emission at the rated current I. Furthermore, as shown in FIG. 5B, by setting the current value to 8I, and by making the duty ratio of the illumination period during time division light emission to be 1/5, it becomes possible to obtain a light emission intensity equal to that of continuous light emission at an electrical current value of 8I/5.

Figure 6:
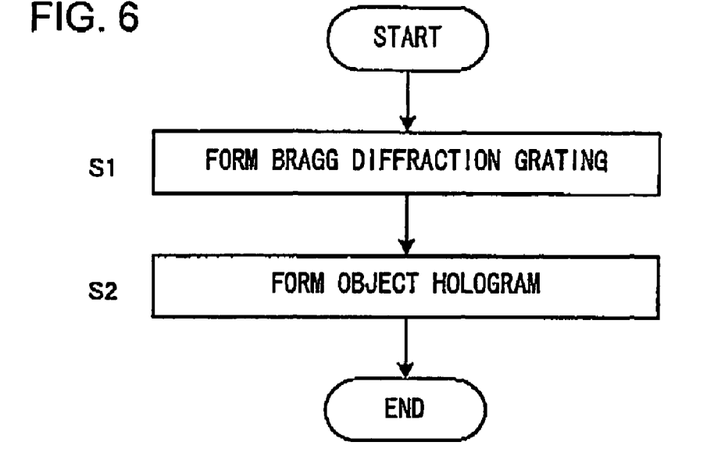
FIG. 6 is a flow chart showing a manufacturing method for a display element according to an embodiment.

FIG. 6 is a flow chart showing a manufacturing method for a liquid crystal display panel 7 (i.e., a display element), according to an embodiment of the present invention.

In a step S1, the Bragg diffraction grating is formed within the display substrate 7; in more detail, in a first region of the liquid crystal layer 702. And in a step S2, the object hologram 704 is formed within the display substrate 7; in more detail, in a second region within the liquid crystal layer 702 that is different from the first region.

Figure 7:
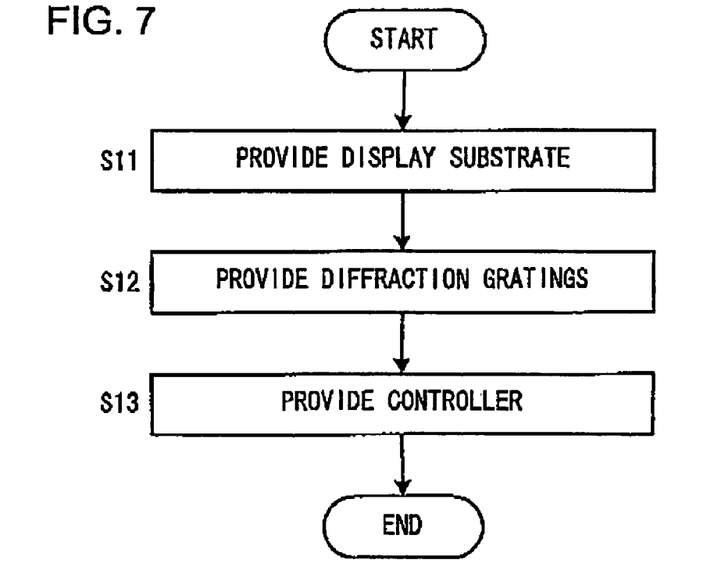
FIG. 7 is a flow chart showing a manufacturing method for a display device according to an embodiment.

FIG. 7 is a flow chart showing a manufacturing method for a display device, according to an embodiment of the present invention.

In a step S11, the display substrate 7 is provided that includes the liquid crystal layer 702. And in a step S12, a plurality of diffraction gratings having different diffraction modes are provided to the display substrate 7; in more detail, in regions in the liquid crystal layer 702 that are mutually different from one another. Here, this plurality of diffraction gratings that have different diffraction modes may be, for example, the Bragg diffraction grating 703 and the object hologram 704. And, in a step S13, a controller 10 is provided that alternately controls this plurality of diffraction gratings to diffraction states.

Figure 8:
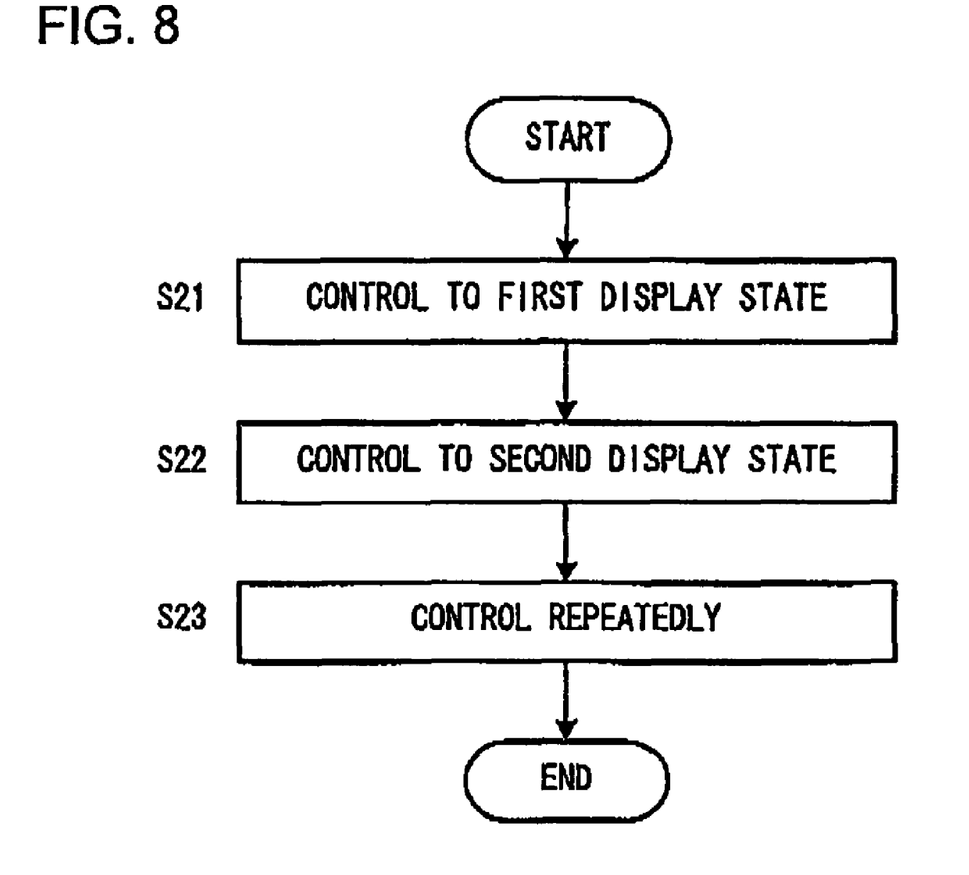
FIG. 8 is a flowchart for explanation of a display method that utilizes a display device according to an embodiment.

FIG. 8 is a flow chart for explanation of a display method that utilizes a display device according to an embodiment of the present invention. This processing is performed by the control device 10.

In a step S21, along with setting the Bragg diffraction grating 703 that is formed in the liquid crystal layer 702 of the liquid crystal display panel 7 to the diffraction state, the object hologram 704 that is formed in the liquid crystal layer 702 is set to the non-diffraction state. Furthermore, the light beam from the light source 8 is irradiated into the liquid crystal panel 7 so as to achieve the first display state (refer to FIG. 3A).

And, in a step S22, along with not irradiating any light beam into the liquid crystal display panel 7 and setting the object hologram 704 to the diffraction state, the Bragg diffraction grating 703 is set to the non-diffracting state, so as to achieve the second display state (refer to FIG. 3B). Then, in a step S23, control is performed so as to repeat the first display state and the second display state alternatingly.

A summary of the advantageous operational effects of the embodiments explained above is as follows.

(1) Since each of the plurality of diffraction gratings 703 and 704 of different diffraction modes are formed within the same display substrate, in concrete terms within the liquid crystal layer 702, and in different regions thereof, accordingly it is possible to perform display of different diffraction modes with a single liquid crystal panel, and it is possible to make the display device more compact. It should be understood that it would also be acceptable, as the diffraction gratings of different diffraction modes, to provide a Bragg diffraction grating that diffracts the illumination light beam in a predetermined direction, and a hologram that emits scattered light.

(2) The display device according to the embodiment includes the display element 7, the illumination device 8 that illuminates the display element 7, and the control device 10 that controls the implementation of the diffraction states and the illumination device 8. This control device 10 performs time division display control by alternatingly repeating the first display state in which the illumination device 8 is turned on, the Bragg diffraction grating 703 is set to the diffraction state, and the diffraction state of the hologram 704 is cancelled, and the second display state in which, along with canceling the illumination device 8 and the diffraction state of the Bragg diffraction grating 703, the diffraction state of the hologram 704 is implemented. As a result, along with it being possible to anticipate making the display device more compact, also it is possible to perform display according to the different diffraction modes that are provided upon the same substrate simultaneously. It should be understood that it would also be acceptable to arrange to use a light emitting diode as the illumination device 8, and to determine the effective amount of light generated by the light emitting diode, based upon the ratio between the continuous time period in the first display state, and the continuous time period in the second display state.

(3) By alternatingly repeating, within the time interval that the first display state continues, lighting up and turning off of the light emitting diode at an electrical current that exceeds its static rated electric current so as to control the amount of light generated by the light emitting diode to an effective amount of generated light, along with it being possible to perform control of the effective amount of generated light in a simple manner, it is also possible to change it dynamically.

Although in this embodiment, by way of example, a digital camera was explained that used a solid image capture element such as a CCD or a CMOS for the image capture element, the present invention could also be applied to a camera that utilizes a silver halide film as the image capture element 2. It should be understood that, although two types of diffraction gratings having different diffraction modes were provided to the liquid crystal display panel 7, it would also be acceptable to provide three or more types of diffraction gratings. Furthermore, the present invention is not to be considered as being limited in any way by the embodiments described above, provided that its characterizing features are not lost.

The above-described embodiments are examples, and various modifications can be made without departing from the scope of the invention.

What is claimed is:

1. A display device, comprising:
   a liquid crystal panel that holds a layer of liquid crystal between substrates;
   a first diffraction grating which has a first diffraction method in which a light beam incident to the liquid crystal panel is diffracted in a predetermined direction;
   a second diffraction grating which has a second diffraction method, which is different from the first diffraction method, in which a light beam incident to the liquid crystal panel is scattered, with the first diffraction grating and the second diffraction grating being arranged in different regions respectively of the layer of liquid crystal;
   a light source that emits an illumination light onto a side of the liquid crystal panel; and
   a controller that controls the liquid crystal panel and the light source to alternately repeat first and second display states, wherein:
   in the first display state, the controller turns on the light source, controls the first diffraction grating to diffract the illumination light beam from the light source, and controls the second diffraction grating not to scatter the illumination light beam so that the first diffraction grating is illuminated whereas in the second display state, the controller turns off the light source, controls the first diffraction grating not to diffract the light beam incident to the liquid crystal panel, and controls the second diffraction grating to scatter the light beam incident to the liquid crystal panel so that the second diffraction grating is darkened.

2. A display device according to claim 1, wherein:
   the first diffraction grating is disposed in a first region of the layer of liquid crystal; and
   the second diffraction grating is disposed in a second region peripheral to the first region.

3. A display device according to claim 1, wherein:
   the first diffraction grating diffracts the illumination light beam from the light source in the predetermined direction which is perpendicular to the liquid crystal panel.

4. A display device according to claim 1, wherein:
   the first diffraction grating is a Bragg diffraction grating that diffracts the illumination light beam in the predetermined direction, and the second diffraction grating creates scattered light.

5. A display device according to claim 4, wherein:
   the light source comprises a light emitting diode; and
   the controller determines an effective amount of light generated by the light emitting diode, based upon a ratio between a continuous time period of the first display state, and a continuous time period of the second display state.

6. A display device according to claim 5, wherein:
the controller controls an amount of light generated by the light emitting diode to the effective amount of light generated, by alternately repeating, within the continuous time period of the first display state, lighting up the light emitting diode with an electrical current that is greater than its static rated electrical current, and turning off the light emitting diode.

7. A camera, comprising
a display device according to claim 1, wherein:
the display device is a viewfinder display device.

8. A camera according to claim 7, wherein:
the camera comprises a function of selecting an image capture region among a plurality of image capture regions; and
the controller performs display of photographic information by controlling the first diffraction grating to diffract the illumination light beam, and changes a region of the second diffraction grating at which the incident light beam is scattered according to the selected image capture region by controlling the second diffraction grating.

* * * * *